(12) United States Patent
Tomsha

(10) Patent No.: US 8,534,681 B2
(45) Date of Patent: Sep. 17, 2013

(54) BUCKET CART SYSTEM AND BUCKET CART

(76) Inventor: Patrick Andrew Tomsha, Valley, WA (US)

(*) Notice: Subject to any disclaimer, the term of this patent is extended or adjusted under 35 U.S.C. 154(b) by 0 days.

(21) Appl. No.: 13/317,786

(22) Filed: Oct. 27, 2011

(65) Prior Publication Data

US 2013/0106071 A1 May 2, 2013

(51) Int. Cl.
*B62B 1/26* (2006.01)
*B62B 1/10* (2006.01)

(52) U.S. Cl.
USPC ............... 280/47.19; 280/47.18; 280/47.131; 280/47.24; 280/47.26

(58) Field of Classification Search
USPC .......... 280/79.11, 79.2, 79.5, 63, 47.17–47.2, 280/47.24, 47.26, 47.131, 47.315
See application file for complete search history.

(56) References Cited

U.S. PATENT DOCUMENTS

| | | | | |
|---|---|---|---|---|
| 2,667,320 A | * | 1/1954 | Whitley | 248/147 |
| 2,745,676 A | * | 5/1956 | Scott | 280/47.26 |
| 2,862,220 A | * | 12/1958 | Orr | 15/246.4 |
| 3,188,109 A | * | 6/1965 | Broadrick | 280/47.26 |
| 3,191,960 A | * | 6/1965 | Turner | 280/47.19 |
| 3,292,795 A | * | 12/1966 | Chappell | 211/85.19 |
| 3,377,085 A | * | 4/1968 | Fralick | 280/408 |
| 3,379,451 A | * | 4/1968 | Marini et al. | 280/47.19 |
| 3,399,903 A | * | 9/1968 | Bailey | 280/47.34 |
| 3,423,102 A | * | 1/1969 | Heldenbrand | 280/47.19 |
| 3,463,502 A | * | 8/1969 | Gough | 280/8 |
| D219,870 S | * | 2/1971 | Stover | D34/24 |
| RE27,437 E | * | 7/1972 | Bailey | 280/47.19 |
| 3,749,414 A | * | 7/1973 | Lynn | 280/47.19 |
| 3,762,738 A | * | 10/1973 | Christina | 280/47.19 |
| D246,848 S | * | 1/1978 | Allen | D34/12 |
| 4,629,203 A | * | 12/1986 | Ballard | 280/47.26 |
| 5,040,808 A | * | 8/1991 | McIntyre | 280/47.19 |
| 5,088,751 A | * | 2/1992 | Zint | 280/47.34 |
| D351,700 S | * | 10/1994 | Uzelman | D34/5 |
| 5,433,463 A | * | 7/1995 | Finley | 280/47.16 |
| 5,806,867 A | * | 9/1998 | Hampton | 280/47.34 |
| 5,860,659 A | * | 1/1999 | Hart | 280/79.5 |
| 5,957,145 A | * | 9/1999 | Plumer | 135/16 |
| D417,054 S | * | 11/1999 | Dziengielewski | D34/24 |
| 6,027,128 A | * | 2/2000 | Stich et al. | 280/47.16 |
| 6,053,516 A | * | 4/2000 | Ottaway | 280/79.5 |
| 6,109,644 A | * | 8/2000 | Cox | 280/652 |
| 6,419,246 B1 | * | 7/2002 | Neal | 280/79.5 |
| 6,454,281 B1 | * | 9/2002 | Pearson | 280/47.26 |
| D477,900 S | * | 7/2003 | Ditmars, Jr. | D34/24 |
| D481,511 S | * | 10/2003 | Lee | D34/24 |

(Continued)

*Primary Examiner* — J. Allen Shriver, II
*Assistant Examiner* — Travis Coolman
(74) *Attorney, Agent, or Firm* — Risso & Associates

(57) ABSTRACT

A first bucket cart with a central rigid horizontal elongate support member, a downwardly facing support member, an axle member, an upwardly facing vertical support member, a first hoop member, a second hoop member, an elongate handle member and a pair of wheels. The axle is perpendicularly attached to the central elongate support member. The wheels are attached to either end of the axle. The upwardly facing vertical support member is attached to the central support member. The elongate handle is attached to the forward end of the central support member. The first and second hoop members are each attached at one point in a horizontal position aligned with the central elongate support member to the top of the vertical support member. The downwardly facing support member is attached at one end to the forward portion of the central support member.

12 Claims, 3 Drawing Sheets

(56) References Cited

U.S. PATENT DOCUMENTS

| | | |
|---|---|---|
| 7,018,155 B1 * | 3/2006 | Heberling et al. ............ 414/408 |
| 7,104,556 B1 * | 9/2006 | Young ........................ 280/47.35 |
| D532,176 S * | 11/2006 | Ditmars, Jr. .................. D34/21 |
| 7,438,300 B1 * | 10/2008 | Zien et al. .................... 280/79.5 |
| 8,262,106 B1 * | 9/2012 | Suszynsky ............... 280/47.131 |
| 2003/0020249 A1 * | 1/2003 | Webster et al. ................. 280/43 |
| 2010/0225077 A1 * | 9/2010 | Plesh et al. ................. 280/47.23 |
| 2012/0139200 A1 * | 6/2012 | Plesh et al. ................. 280/47.18 |

* cited by examiner

BUCKET CART SYSTEM AND BUCKET CART

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of wheeled cart and more specifically to a five gallon bucket cart. Five gallon buckets are frequently used to store and carry a variety of items including paint, tools, soil, water or any variety of items. The buckets have evolved into a standard size and shape.

It obviously would be a good idea to develop a rolling cart to help carry these buckets from one place to another, especially if filled with heavy items. To this end some manufacturers have designed and sold a wheeled five gallon bucket carrier. One such carrier is manufactured by Broil Tools.com. It is designed to carry a single bucket and has a feature that helps the user tip the bucket even while it is retained in the carrier.

However, there is a deficiency in the prior technology in that none of the prior designs can accommodate the transport of a plurality of five gallon buckets at the same time.

BRIEF SUMMARY OF THE INVENTION

The primary object of the invention is to provide a cart for five gallon buckets that allows the user to easily transport a plurality of buckets at one time.

Another object of the invention is to provide a cart for five gallon buckets that is easy and economical to manufacture.

Another object of the invention is to provide a cart for five gallon buckets that allows the user to add or subtract bucket carts from a chain of carts as is needed.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a first bucket cart comprising: a central rigid horizontal elongate support member, a downwardly facing support member, an axle member, an upwardly facing vertical support member, a first hoop member, a second hoop member, an elongate handle member, a pair of wheels, said axle member perpendicularly disposed and centrally attached to said central rigid horizontal elongate support member, said pair of wheels attached to either end of said axle member, said upwardly facing vertical support member fixedly attached to said central rigid horizontal elongate support member, said elongate handle member fixedly attached to the forward most end of said central rigid horizontal elongate support member, said first and second hoop members each attached at one point in a horizontal position aligned with said central elongate support member to the top of said vertical support member, and said downwardly facing support member fixedly attached at one end in a vertical orientation to the forward portion of said central rigid horizontal elongate support member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
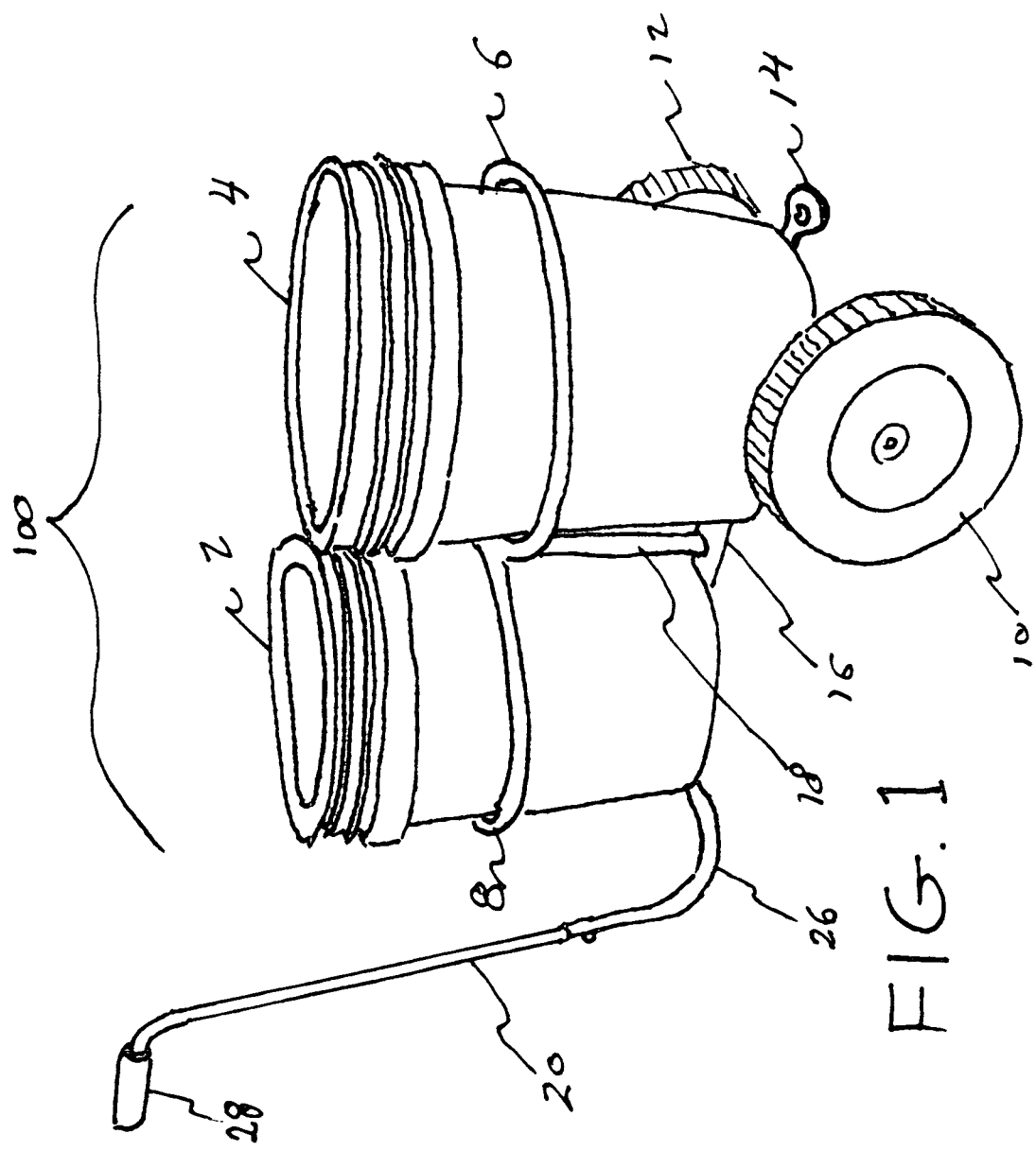
FIG. 1 is a perspective view of the invention.
Figure 2:
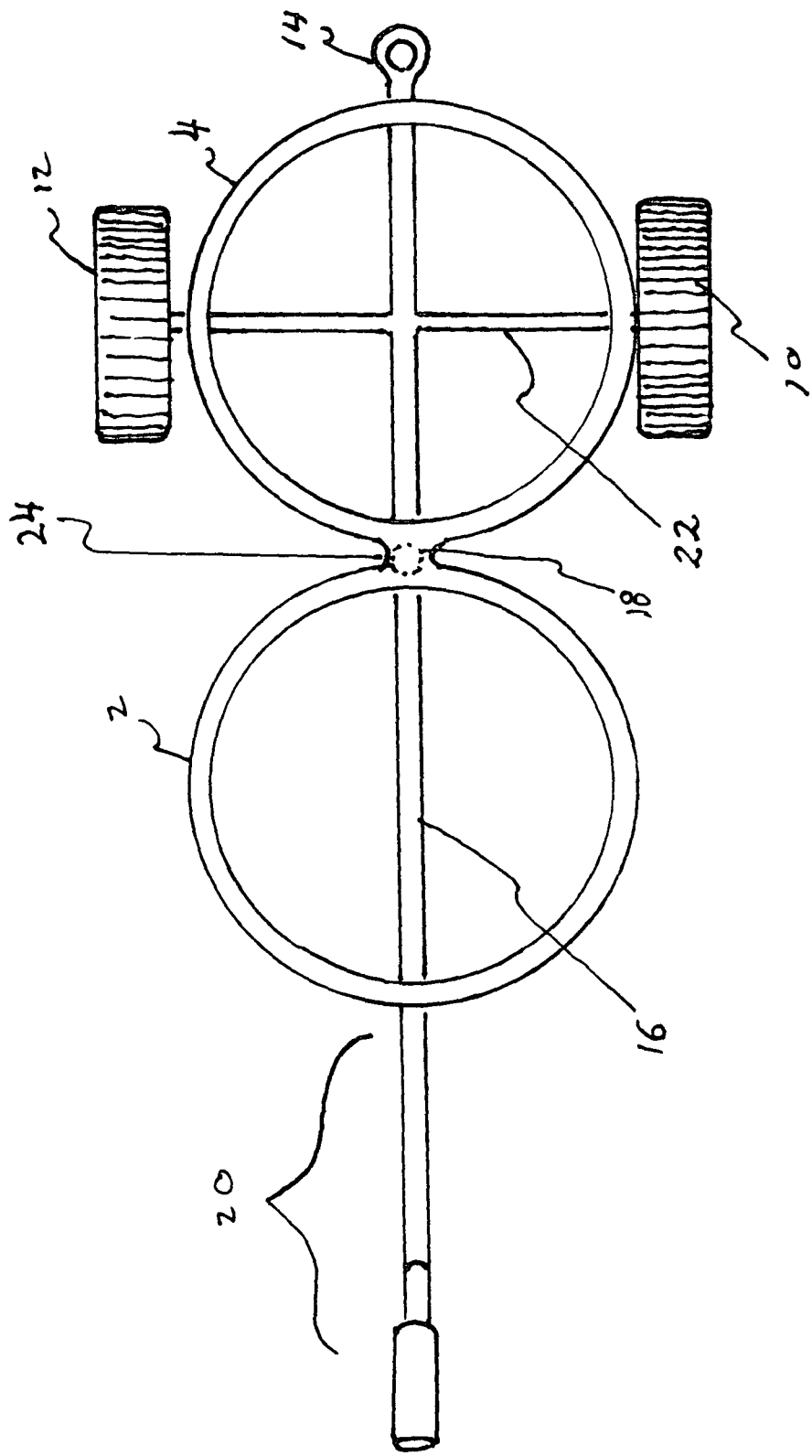
FIG. 2 is a top view of the invention.
Figure 3:
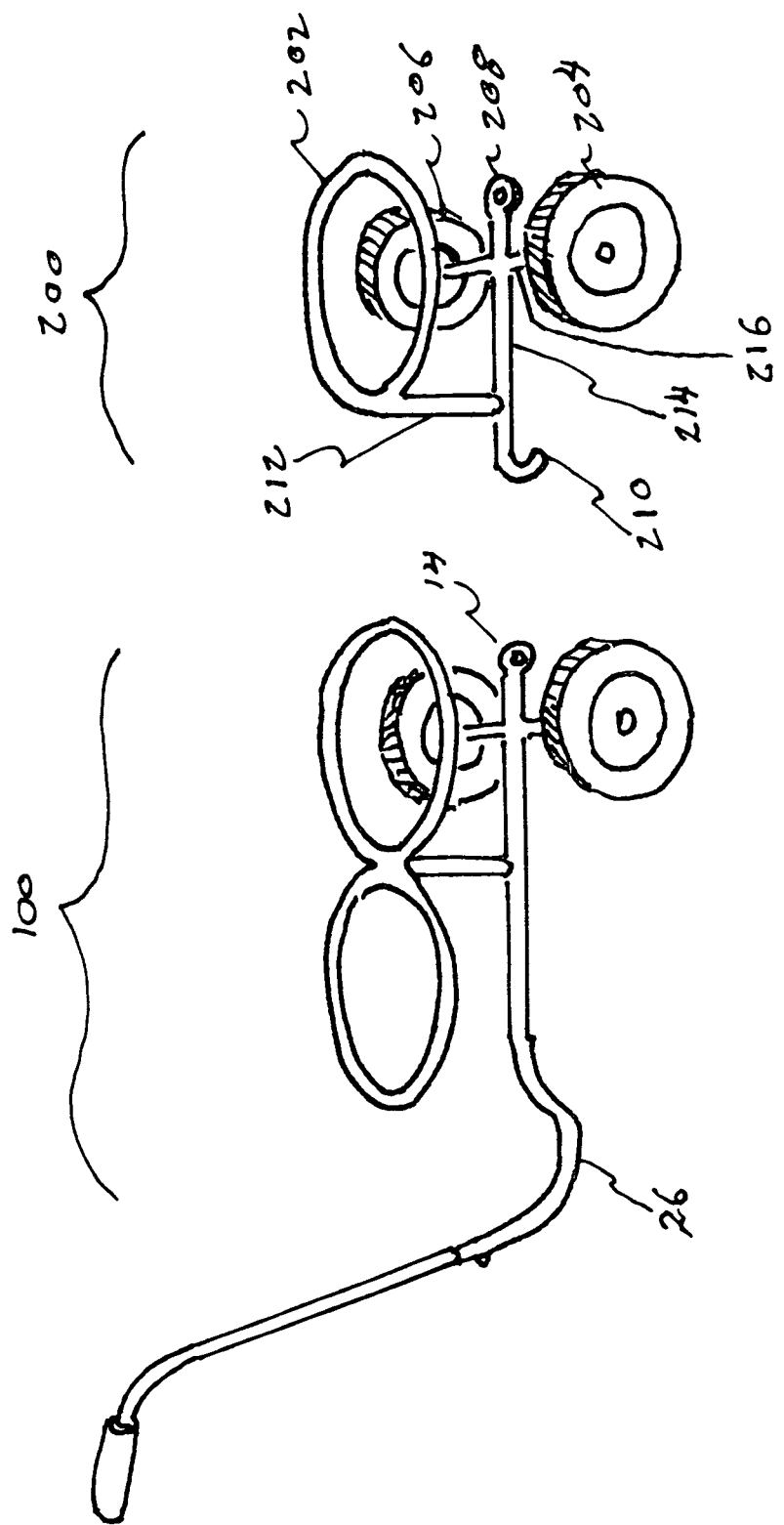
FIG. 3 is a perspective view of the invention with secondary carts attached

Referring now to FIG. 1 we see a perspective view of the invention 100. A central rigid horizontal elongate support member 16 acts as a bottom support for the two five gallon buckets 2, 4 An axle member 22 shown in FIGS. 2 and 3 is fixedly attached to the central support member 16 and terminates in wheels 10, 12. An upwardly directed vertical support member 18 is attached at its bottom end to central support member 16 and at its top to hoop members 6, 8 which slidably retain buckets 2, 4. A downwardly facing support member 26 contacts the ground when the invention 100 is at rest. An elongate handle member 20 attaches at one end to central support member 16 and at the opposite end terminates in a hand grip 28. During use, the user lifts handle 28 and pulls the entire unit 100 forward or whatever direction is needed. A loop member 14 is attached to the distal end of central support member 16 and is used to attach additional bucket carts as will be described when discussing FIG. 3.

FIG. 2 is a plan top view of the invention 100. Central support member 16 can be clearly seen as well as the location of hoops 2, 4 and wheels 10, 12. Hoops 2,4 are attached to each other 24 at the point where vertical support member, shown by dotted lines 18, terminates.

FIG. 3 is a perspective view of the invention 100 and an additional bucket cart 200. The construction of bucket cart 200 is similar to the invention 100 except that it only holds one bucket and it does not have an elongate handle member. Additional cart 200 includes a second horizontal elongate support member 214, a second axle 216, a second vertical support member 212, a second hoop member 202 and a second pair of wheels 204, 206. Hook member 210 is attached to the front end of central support member 214 and is capable of engaging loop member 14. Central second support member 213 terminates at its distal end in a loop member 208. This enables additional second cart units 200 to be attached to each other creating a train of carts 200.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A bucket cart system comprising at least a first bucket cart wherein the first bucket cart comprises:
    a central rigid horizontal elongate support member;
    an axle member;
    an upwardly facing vertical support member;
    a first hoop member, the first hoop member having a first circumference;
    a second hoop member, the second hoop member having a second circumference;
    an elongate handle member;
    a pair of wheels;
    said axle member perpendicularly disposed and centrally attached to said central rigid horizontal elongate support member;
    said pair of wheels attached to said axle member;
    said upwardly facing vertical support member fixedly attached to said central rigid horizontal elongate support member;
    said elongate handle member attached to the central rigid horizontal elongate support member;
    said first and second hoop members are each attached at a single attachment point in a horizontal position aligned with said central elongate support member to the top of said vertical support member;
    wherein the single attachment point at which the first hoop member is attached with the vertical support member is the only attachment point for support of the first hoop member and wherein the single attachment point at which the second hoop member is attached with the vertical support member is the only attachment point for support of the second hoop member; and
    wherein the single attachment point at which the first hoop member is attached with the vertical support member is the only attachment point for support of the first hoop member and wherein the single attachment point at which the second hoop member is attached with the vertical support member is the only attachment point for support of the second hoop member.

2. The bucket cart system as claimed in claim 1 further comprising a rigid loop member fixedly attached to said axle member and extending outward horizontally;
    a second bucket cart having a second pair of wheels attached to a second axle which is centrally attached to a second horizontal elongate member;
    a rigid hook fixedly attached to a front portion of said second horizontal elongate member so that said rigid hook can removably engage said rigid loop member of said first bucket cart;
    said second bucket cart also having, a second vertical support member attached with said second horizontal elongate member, and a second bucket cart hoop member attached with the second vertical support member; and
    a loop member extending, out from said second axle so that a chain of bucket carts may be fashioned by hooking a plurality of said second bucket carts to said first bucket cart.

3. The bucket cart system as claimed in claim 2, wherein the second bucket cart hoop member is attached at a single attachment point with the second vertical support member such that the single attachment point at which the second bucket cart hoop member is attached with the second vertical support member is the only attachment point for support of the second bucket cart hoop member.

4. The bucket cart system as claimed in claim 1, wherein each of the first and second hoop members have an inner diameter that is approximately the same as an outer diameter of a five gallon bucket.

5. A bucket cart system comprising at least a first bucket cart, wherein the first bucket cart comprises:
    a central rigid horizontal elongate support member;
    an axle member;
    an upwardly facing vertical support member;
    a first hoop member, the first hoop member having a first circumference;
    a second hoop member, the second hoop member having a second circumference;
    an elongate handle member;
    a pair of wheels;
    said axle member attached to said central rigid horizontal elongate support member;
    said pair of wheels attached to said axle member;
    said upwardly facing vertical support member fixedly attached to said central rigid horizontal elongate support member;
    said elongate handle member attached to the central rigid horizontal elongate support member; and
    said first and second hoop members are each attached at a single attachment point in a horizontal position aligned with said central elongate support member to the top of said vertical support member;
    wherein the single attachment point at which the first hoop member is attached with the vertical support member is the only attachment point for support of the first hoop member and wherein the single attachment point at which the second hoop member is attached with the vertical support member is the only attachment point for support of the second hoop member; and
    wherein each of the first and second hoop members are fixedly attached with respect to each other at the single attachment point in a manner preventing relative vertical movement between said first and second hoop members.

6. The bucket cart system as claimed in claim 5 further comprising a rigid loop member fixedly attached to said axle member and extending outward horizontally;
    a second bucket cart having a second pair of wheels attached to a second axle which is centrally attached to a second horizontal elongate member;
    a rigid hook fixedly attached to a front portion of said second horizontal elongate member so that said rigid hook can removably engage said rigid loop member of said first bucket cart;
    said second bucket cart also having a second vertical support member attached with said second horizontal elongate member, and a second bucket cart hoop member attached with the second vertical support member; and
    a loop member extending out from said second axle so that a chain of bucket carts may be fashioned by hooking a plurality of said second bucket carts to said first bucket cart.

7. The bucket cart system as claimed in claim 6, wherein the second bucket cart hoop member is attached at a single attachment point with the second vertical support member such that the single attachment point at which the second bucket cart hoop member is attached with the second vertical support member is the only attachment point for support of the second bucket cart hoop member.

8. The bucket cart system as claimed in claim 5, wherein each of the first and second hoop members has an inner diameter that is approximately the same as an outer diameter of a five gallon bucket.

9. A first bucket cart comprising:
a central rigid horizontal elongate support member;
an axle member;
an upwardly facing vertical support member;
a first hoop member, the first hoop member having a first circumference;
a second hoop member, the second hoop member having a second circumference;
an elongate handle member;
a pair of wheels;
said axle member attached to said central rigid horizontal elongate support member;
said pair of wheels attached to said axle member;
said upwardly facing vertical support member fixedly attached to said central rigid horizontal elongate support member;
said elongate handle member attached to the central rigid horizontal elongate support member; and
said first and second hoop members are each attached at a single attachment point in a horizontal position aligned with said central elongate support member to the top of said vertical support member;
wherein the single attachment point at which the first hoop member is attached with the vertical support member is the only attachment point for support of the first hoop member and wherein the single attachment point at which the second hoop member is attached with the vertical support member is the only attachment point for support of the second hoop member; and
wherein each of the first and second hoop members has a non-adjustable diameter.

10. The bucket cart system as claimed in claim 9 further comprising a rigid loop member fixedly attached to said axle member and extending outward horizontally;
a second bucket cart having a second pair of wheels attached to a second axle which is centrally attached to a second horizontal elongate member;
a rigid hook fixedly attached to a front portion of said second horizontal elongate member so that said rigid hook can removably engage said rigid loop member of said first bucket cart;
said second bucket cart also having a second vertical support member attached with said second horizontal elongate member, and a second bucket cart hoop member attached with the second vertical support member; and
a loop member extending out from said second axle so that a chain of bucket carts may be fashioned by hooking a plurality of said second bucket carts to said first bucket cart.

11. The bucket cart system as claimed in claim 10, wherein the second bucket cart hoop member is attached at a single attachment point with the second vertical support member such that the single attachment point at which the second bucket cart hoop member is attached with the second vertical support member is the only attachment point for support of the second bucket cart hoop member.

12. The bucket cart system as claimed in claim 9, wherein each of the first and second hoop members has an inner diameter that is approximately the same as an outer diameter of a five gallon bucket.

* * * * *